June 8, 1965

F. B. DE PODESTA 3,187,686

CARGO HOLDDOWN APPARATUS

Filed May 8, 1961

INVENTOR.
FRANK B. DE PODESTA
BY
Barney, Kinelle, Raisch & Choate
ATTORNEYS

June 8, 1965  F. B. DE PODESTA  3,187,686
CARGO HOLDDOWN APPARATUS
Filed May 8, 1961  3 Sheets-Sheet 2
Fig. 2
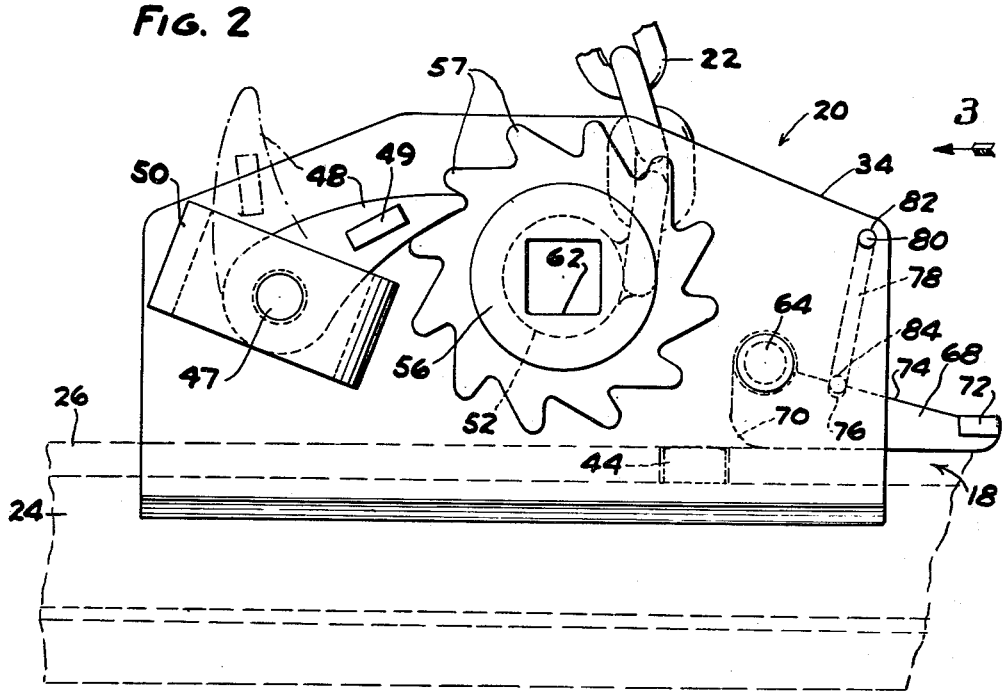
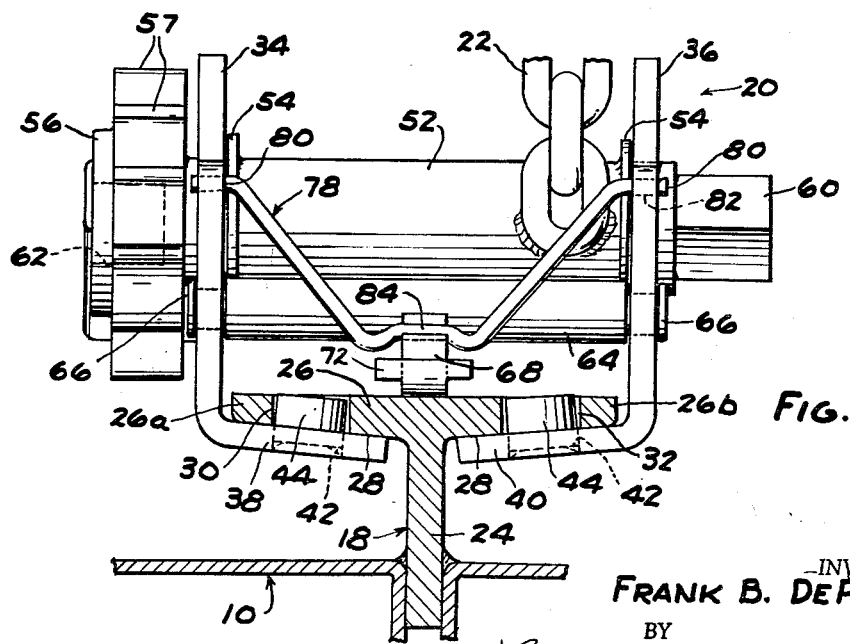
Fig. 3
INVENTOR.
FRANK B. DE PODESTA
BY
ATTORNEYS

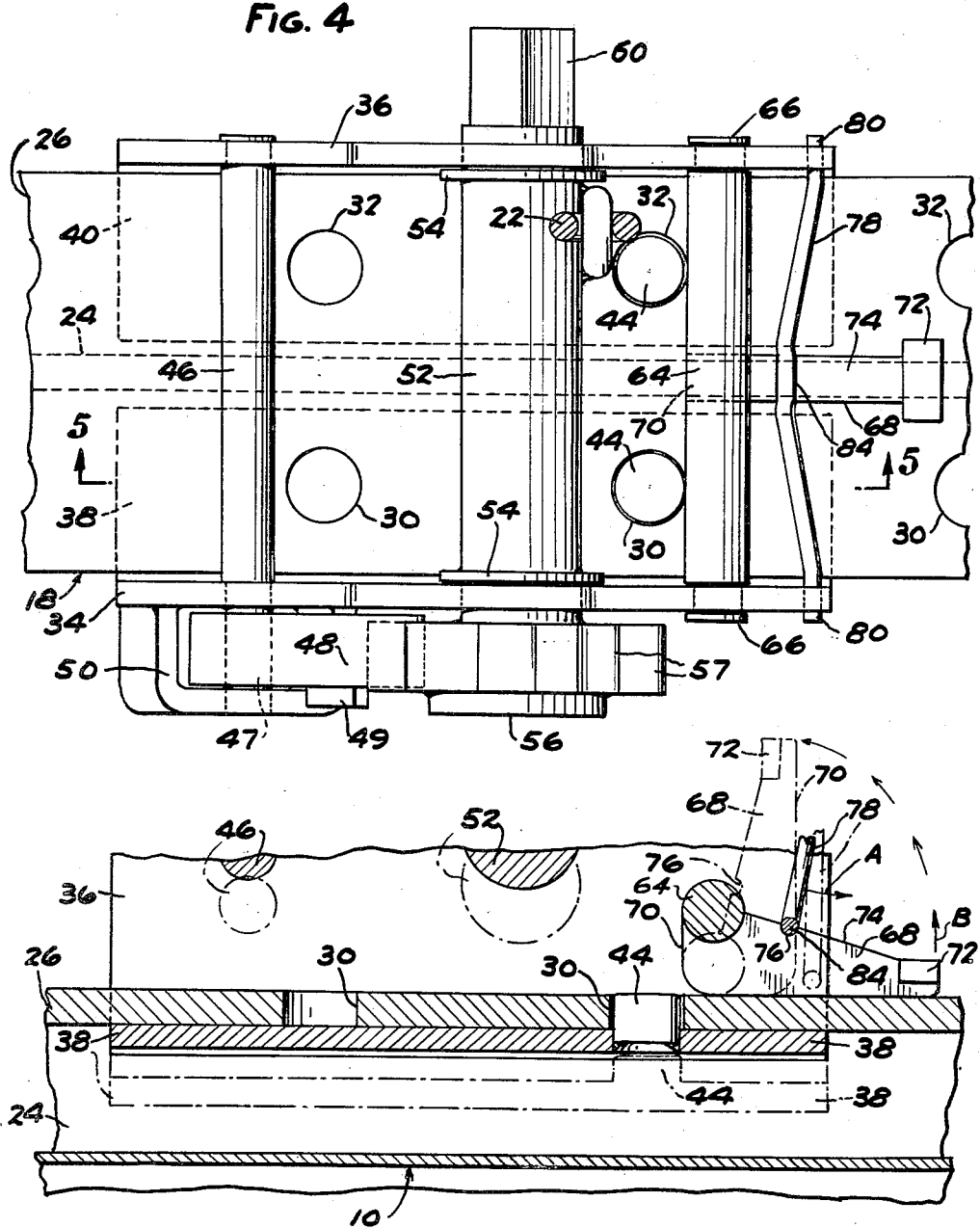

United States Patent Office 3,187,686
Patented June 8, 1965

3,187,686
CARGO HOLDDOWN APPARATUS
Frank B. De Podesta, Farmington, Mich., assignor to Paragon Bridge & Steel Company, Novi, Mich., a corporation of Michigan
Filed May 8, 1961, Ser. No. 108,503
12 Claims. (Cl. 105—368)

This invention relates generally to apparatus for securing cargo to a carrier conveyance, and more particularly to holddown apparatus for securing automotive vehicles during shipment on railway cars or highway haulaways.

A large percentage of the automotive vehicles manufactured today are shipped from the point of final assembly to dealers on specially designed multi-level railway or highway carriers, the vehicles usually being end loaded on the carrier and then arranged on each level thereof in tandem relation. In either type of conveyance, it is necessary to provide vehicle tie-down means capable of reliably securing numerous makes and models of vehicles which vary in length, road clearance and weight.

Hitherto many types of holddown mechanisms have been provided for the specific purpose of securing automobiles for shipment in railroad freight cars. However, many of these prior art holddowns utilize a channel or trench type of anchoring structure which is costly to manufacture as well as to install in the deck or floor of the freight car, and which is unsuitable for use on decks exposed to the weather elements due to the tendency of a channel or slotted structure to become clogged with snow, ice, slush or dirt. Other of these prior art structures use various types of threaded fasteners which are easily jammed by corrosion and are time consuming to operate, thereby increasing the labor costs involved in loading and securing the vehicles on the railroad car. While it is known in the prior art to combine a windlass mechanism with some form of anchoring means, there remains a need for holddown apparatus economically incorporating a windlass mechanism with adjustable anchoring structure which overcomes the above problems.

It is an object of the present invention to provide improved holddown apparatus for reliably and economically securing cargo for shipment on carrier conveyances.

Another object is to provide an improved holddown windlass mechanism and guide track therefor which together provide tie-down apparatus easily adjustable for securing different sizes of vehicles even when used on open type vehicle carriers which are subjected to severe icing conditions during the winter months.

A further object is to provide improved holddown apparatus which is capable of providing connection through a wide range of tie-down angles between the vehicle and the carrier.

Still another object is to provide vehicle holddown apparatus of the above character having sufficient strength to withstand the severe impact stresses of railroad humping and coupling operations.

Still another object is to provide improved holddown apparatus of the above character which may be quickly operated by different forms of wrenches and from either side of such apparatus.

In the accompanying drawings:

FIG. 2 is an enlarged side elevational view of the holddown windlass mechanism in a locked position on the guide track.

FIG. 3 is an end elevational view of the holddown mechanism of FIG. 2.

FIG. 4 is a top plan view of the holddown mechanism of FIG. 2.

FIG. 5 is an elevational cross sectional view taken on the line 5—5 of FIG. 4, together with a phantom view of the holddown windlass mechanism in the lowered, unlocked position thereof shown superimposed in broken lines.

Figure 1:
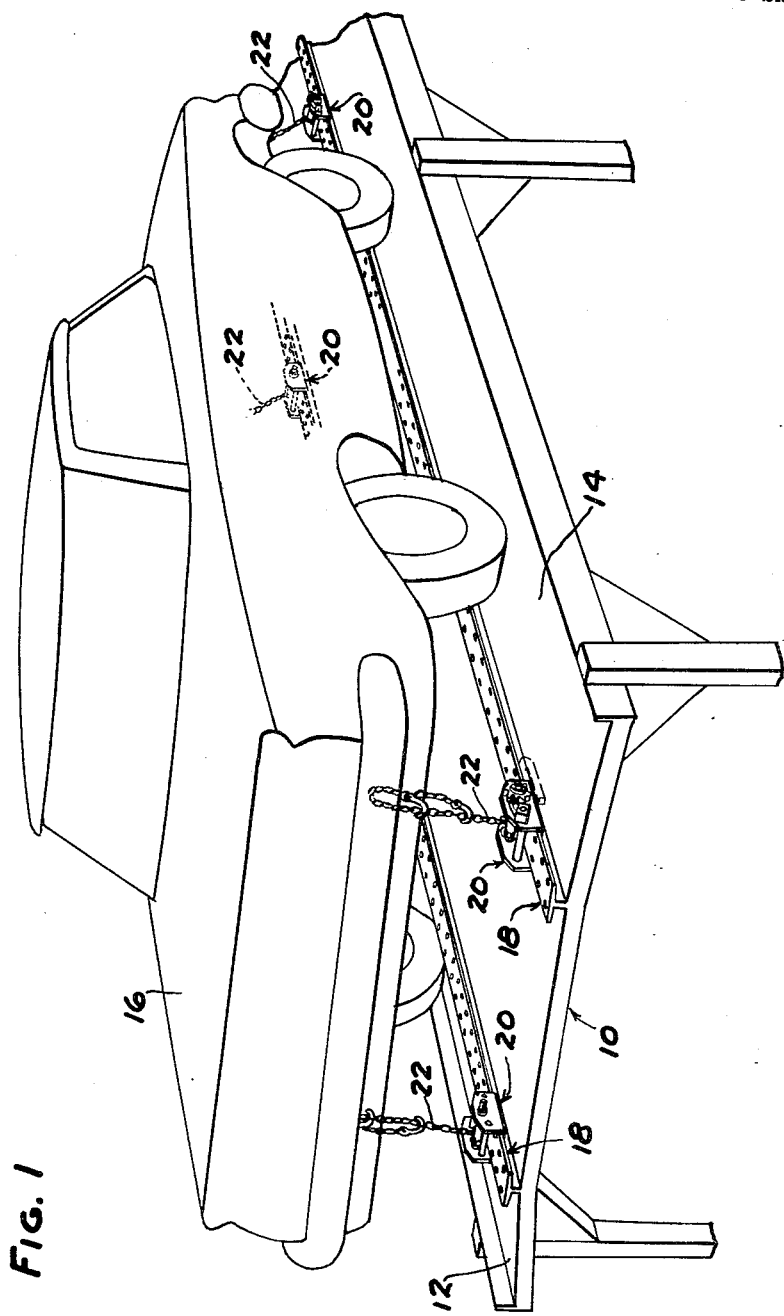
FIG. 1 is a fragmentary perspective view of a deck of a railroad automobile loader car provided with four holddown windlass mechanisms and a pair of guide tracks therefor of the present invention for use in securing an automobile to the deck.

Referring to FIG. 1 of the accompanying drawings, the holddown apparatus of the invention is shown installed on one of the decks 10 of a multi-level automobile loader railroad car which may be of conventional construction well understood in the art and therefore not shown in full. However, the present invention is particularly advantageous when utilized in a vehicle carrying railroad car as disclosed in copending patent application entitled Railway Carrier for Automotive Vehicles, Serial No. 91,879, filed February 27, 1961 by myself and others.

Such railroad cars as well as conventional automobile haulaway trailers customarily have suitable deck plates 12 and 14 or other equivalent structures which extend longitudinally of the deck 10 at the sides thereof to provide a pair of wheel tracks for receiving the wheels of a passenger car 16 thereon. For fast loading of the automobiles and maximum utilization of space on the carrier, it is ordinarily preferred to "circus load" the carrier by driving the automobiles individually onto the end one of a series of end coupled cars and then along wheel tracks 12, 14 and over suitable bridges spanning from one car to another, each automobile being parked and then tied down behind the preceding automobile in tandem arrangement on deck 10 until all the cars are so loaded.

The disclosed embodiment of the holddown apparatus of the present invention is particularly adapted to such loading techniques and includes a guide track and anchoring structure 18 secured to the deck structure 10 and a plurality of holddown windlass mechanisms 20 slidably mounted thereon for securing automobile 16, via a suitable flexible element such as a chain 22, in place on deck 10. In a preferred arrangement, two guide tracks 18 are mounted on each deck 10, one adjacent each inner side of wheel tracks 12 and 14 so as to be straddled by the wheels of automobile 16. Preferably four holddowns 20 are utilized to secure each vehicle, two at the front and two at the rear thereof as illustrated in FIG. 1. The manner of securing chains 22 to automobile 16 and tensioning of the chains to pull the automobile down on its springs is conventional and therefore not described herein. Also, it will be appreciated that the overall height of holddown mechanisms 20 and guide tracks 18 above wheel tracks 12, 14 must not exceed the minimum road clearance of vehicles circus loaded on the carrier.

The structural details of the holddown apparatus of the invention are illustrated in FIGS. 2–5. Guide track anchoring structure 18 comprises a T-section steel beam (FIG. 3) having a vertical center web portion 24 integrally joined at the upper edge thereof to the center of the underside 28 of a horizontal cross flange 26. Center web 24 is mounted between plates of deck structure 10 and welded thereto along the sides of web 24, but may also be welded at the bottom edge of web 24 to mount the beam on a one-piece deck structure. Normally a perpendicular mounting of web 24 relative to the plane of deck 10 is preferred, although web 24 may be tilted relative to the deck so long as cross flange 26 is positioned a predetermined minimum distance above the surface of deck 10 to provide a clearance space between deck 10 and the undersurfaces 28 of cross flange 26. The T-beam 18 may be fabricated from two pieces or may be made integral by cutting a standard H-section beam longitudinally in half. When made by the latter method the undersurfaces 28 of cross flange 26 slope upwardly from the junction thereof with vertical web 24 due to the taper of the flanges 26a and 26b comprising cross flange 26 to provide a strong cantilever section. Two longitudinally extending rows of spaced circular holes 30 and 32 are punched respectively in flanges 26a and 26b of T-beam 18. As seen in FIG. 4, the lateral spacing between each pair of laterally opposite holes 30, 32 is the same, and these laterally adjacent pairs of holes 30, 32 are longitudinally aligned throughout the length of beam 18.

The holddown windlass mechanism 20 includes (FIG. 3) a pair of vertical side plates 34 and 36 spaced laterally apart in parallel relation so as to slidably receive the parallel outer edges of cross flange 26 of beam 18 between the vertical inner surfaces of the side plates. Side plates 34, 36 are each preferably made from a flat plate which is formed into an angle piece by bending the bottom portion thereof along a longitudinal bending line to provide integral flanges 38 and 40 which extend inwardly towards one another from plates 34 and 36 and parallel to undersurfaces 28 of cross flange 26 so that the flanged side plates together thereby embrace flange 26. The inner edges of side plate flanges 38, 40 are spaced from one another to permit relative sliding movement of vertical center web 24 of beam 18 therebetween. A circular hole 42 is punched through each of flanges 38 and 40 prior to the bending operation, and a short stud 44 is inserted in each hole 42 and affixed therein by welding. Studs 44 project upwardly from the upper surfaces of flanges 38, 40 in proper alignment to be received within a pair of laterally opposite holes 30, 32 of cross flange 26 for locking holddown mechanism 20 against movement longitudinally of beam 18. The upper edges of side plates 34, 36 (FIG. 2) slope upwardly from the ends thereof to eliminate sharp corners to reduce damage in case the underside of a vehicle should strike the holddown mechanism while being driven along the deck.

The side plates 34 and 36 are held in parallel spaced relation by a round bar 46 (FIG. 4) which is inserted through and welded in suitable co-axially aligned holes in plates 34, 36 so that bar 46 extends perpendicularly between the plates. One end 47 of bar 46 extends beyond plate 34 and is reduced in diameter to provide a bearing for a pawl 48 (FIG. 2) rotatably received thereon. A U-shaped bracket 50 is welded at the ends of the side arms thereof to the outer surface of plate 34 with the center portion of the bracket extending across the end 47 of bar 46 to retain pawl 48 thereon. The upper edges of the side arms of bracket 50 prevent pivotal movement of pawl 48 beyond the locked (solid lines) and unlocked (dotted lines) positions thereof as indicated in FIG. 2. A tab 49 is welded to the outer side of pawl 48 to assist in pivoting the pawl.

Side plates 34, 36 as braced by bar 46 provide a frame for a windlass barrel 52 which comprises a solid cast steel shaft journalled in side plates 34, 36 so as to extend perpendicularly therebetween for winding and unwinding flexible chain 22 therearound. A pair of metal washers 54 are welded to barrel shaft 52, one adjacent the inner surface of each plate 34, 36, to limit axial movement of the barrel. One end of barrel shaft 52 extends beyond the outer surface of plate 34 and has a ratchet gear 56 integrally joined thereto for rotation therewith. Ratchet gear 56 is provided with a plurality of circumferential teeth 57 shaped to receive the end of pawl 48 therebetween to prevent counterclockwise rotation of gear 56 and hence barrel 52 (as viewed in FIG. 2). The end link 58 of flexible link chain 22 is welded to barrel 52 adjacent one of the washers 54. The opposite end of barrel 52 extends beyond the outer surface of side plate 36 and is shaped in the form of a square nut 60 adapted to receive a square socket wrench or crank for rotating barrel 52. Conversely, the hub of ratchet gear 56 at the other end of barrel 52 is provided with a square shaped recess or bore 62 extending axially inward from the outer face of the hub of gear 56 for receiving the square shaped end of a suitable male wrench. Hence, holddown mechanism 20 is operable from both sides thereof by alternative forms of wrenches.

Holddown mechanism 20 also includes a locking mechanism for raising and lowering side plates 34, 36 relative to beam 18. The locking mechanism includes a shaft 64 which extends perpendicularly between and is journalled for rotation in side plates 34, 36 on the opposite side of barrel 52 from brace bar 46. A pair of metal washers 66 are welded to the reduced ends of shaft 64 adjacent the outer surfaces of plates 34, 36 so as to limit axial movement of shaft 64 and to provide additional bracing for plates 34, 36. An arm 68 is cast integrally with shaft 64 so as to extend generally radially therefrom at the center of the shaft. The bottom side 70 of arm 68 extends tangentially from the periphery of bar 64 downwardly to a 90 degree radius and then horizontally to the outer end of the arm, thereby providing a camming surface eccentric to shaft 64. A pair of lips 72 are provided at the outer ends of arm 68 to facilitate gripping the arm. The upper side 74 of arm 68 extends radially from lips 72 to the shaft 64 and is provided with a transverse recess 76.

The locking mechanism also includes a pivotable latch wire 78 for arm 68 which preferably comprises a Number 8 gauge spring steel wire formed into a W-shape (FIG. 3) with co-axial end portions 80 which are rotatably received in holes 82 punched in the upper corners of side plates 34, 36. The center portion 84 of latch wire 78 is spaced radially a predetermined distance from the axis of rotation of latch wire 78 so that when center portion 84 is received in the recess or notch 76 it resiliently urges arm 68 into the horizontal position illustrated in FIG. 2.

Referring to FIG. 5, a lowered, unlocked position of holddown mechanism 20 is indicated in broken lines wherein latch wire 78 has been pivoted in the direction of arrow A to clear lips 72 and arm 68 has been pivoted in the direction of arrow B to a generally vertical position with the tangential portion of surface 70 thereof resting on flange 26 of the T-beam. The left end of holddown mechanism actually can drop further until bar 46 rests on the upper surface of flange 26, the lower sides of shafts 46 and 64 being positioned relative to the lower side barrel 52 so that it is held clear of cross flange 26 in the lowermost position of the holddown mechanism. In the lowered unlocked position of holddown mechanism 20, the upper ends of studs 44 are clear of engagement with holes 30, 32 so that holddown mechanism 20 may be slid along beam 18 until studs 44 are in registry with another pair of holes 30, 32 where it is desired to next locate the holddown mechanism.

To lock holddown mechanism 20 in the next location, latch wire 78 is again pivoted outwardly and upwardly until it is clear of the path of lips 72 and then arm 68 is rotated downwardly (clockwise as viewed in FIG. 5) until it lies flat against the upper surface of cross flange 26 of beam 18. During this pivotal movement the engagement of cam surface 70 of arm 68 with the upper surface of beam 18 raises side plates 34, 36 into the position shown in solid lines in FIGS. 2 and 5 wherein studs 44 are fully inserted into holes 30, 32. In this position the engagement of studs 44, cam arm 68 and flanges 38, 40 with beam 18 locks holddown mechanism 20 against movement in any direction. Latch wire 78 is then pivoted downwardly until the center portion 84 thereof strikes the top side 74 of arm 68 outwardly of recess 76. Latch 78 is then forcibly pivoted further in this direction (clockwise as viewed in FIGS. 2 and 5), causing center portion 84 to spring upwardly until it reaches notch 76. When once in the notch, the spring tension of latch wire 78 serves to hold it in place therein so that arm 68 is securely maintained in the horizontal, locked position thereof. To unlock holddown mechanism 20, the above sequence is reversed, the entire operation being easily performed in a minimum of time.

The above described holddown mechanism 20 and guide track 18 provide a holddown apparatus which lends itself to low cost manufacturing methods inasmuch as side plates 34, 36 are formed and pierced in a pressing operation, while barrel 52 with ratchet gear 56 thereon, as well as shaft 64 with arm 68 thereon, are formed as one-piece steel castings. Guide track 18 is an easily formed T-section beam which is readily punched to provide the locating and locking holes 30, 32. Since only one pair of studs 44 is needed to lock the holddown mechanism, the longitudinal spacing between laterally opposite pairs of holes 30, 32 need not be held to close tolerances.

T-section beam 18 provides an anchoring member having high strength in a simple configuration which does not tend to collect snow and ice. Also, beam 18 supports holddown mechanism 20 spaced above deck 10 so that dirt or slush which may accumulate on the deck does not interfere with sliding movement of the holddown mechanism along the beam. Should the holes 30, 32 in beam 18 become filled with ice or dirt, the leverage provided by arm 68 is sufficient to move studs 44 up into the clogged holes to thereby clear the same. The disposition of studs 44 and side plate flanges 38, 40 beneath cross web 26 of beam 18 provides a self-locking feature in that an upward component of force, such as that resulting from the tension of chain 22 when it is connected to vehicle 16 and wound tight on barrel 52, is cumulative to the action of arm 68 in urging studs 44 upwardly into engagement with holes 30, 32. However, chain 22 may extend in any direction from barrel 52 since holddown mechanism 20 is locked on beam 18 against movement in all directions.

It is to be understood that suitable barriers, such as angle plates secured by bolts inserted through the pair of holes 30, 32 located at the opposite ends of beam 18, may be installed after holddown mechanisms 20 are slidably received on beam 18 so that they cannot become lost or stolen. If desired, all of the holddown mechanisms may be slid to one end of the beam or entirely removed therefrom, the T-beams then providing a pair of strong, flat and elevated mounting surfaces adapted to readily receive other types of cargo. For example, shipping racks or pallets with automotive bodies mounted thereon may be supported directly on the T-beams and secured in place by bolting or otherwise fastening the shipping rack to the perforated T-beam.

I claim:

1. Apparatus for securing cargo to a cargo carrier having a surface adapted to receive the cargo adjacent thereto, said apparatus comprising anchoring means affixed to said surface of said carrier and having flange means extending longitudinally of and generally parallel to said carrier surface, said flange means having an outer surface facing the cargo and defined by a pair of laterally spaced parallel side edges, said flange means further having an inner surface opposite said outer surface and spaced outwardly from said carrier surface, said inner surface having recess means therein, a holddown device comprising frame means adapted to slidably receive said flange means therein so that said frame means embraces said side edges thereof for longitudinal sliding movement along said outer surface thereof and for limited movement perpendicular thereto between locked and unlocked positions relative thereto, said frame means having a portion adjacent said inner surface of said flange means including projection means extending therefrom for engagement with said recess means of said flange means in the locked position of said frame means to thereby lock said holddown device against longitudinal movement along said flange means, actuating means pivotably connected to said frame means so as to be rotatable into and out of engagement with said outer surface of said flange means for moving said holddown device between said locked and unlocked positions thereof and flexible means for connecting said holddown device to the cargo whereby said holddown device provides a longitudinally adjustable coupling between the cargo and the carrier.

2. The combination recited in claim 1 wherein said flexible means extends from said holddown device in a direction away from said outer surface of said flange means for attachment to the cargo so that tightening said flexible means produces a component of force urging said projection means of said frame means of said holddown device into said recess means in said inner surface of said flange means to thereby help maintain said holddown device locked on said anchoring means.

3. The combination recited in claim 1 wherein said frame means of said holddown device comprises a pair of parallel side plates spaced laterally apart for slidably receiving said side edges of said flange means therebetween, each of said plates having an integral flange extending towards the respectively opposite plate and adjacent said inner surface of said flange means, said projection means extending from the surface of said flanges adjacent said inner surface of said flange means for engagement with said recess means therein.

4. The combination recited in claim 1 wherein said recess means comprise a plurality of holes through said flange means intermediate said side edges thereof, said holes being spaced longitudinally apart in a row extending parallel to said edges to provide a plurality of locking positions for said holddown device along said anchoring means.

5. The combination recited in claim 1 wherein said actuating means comprises a shaft journalled for rotation in said frame means about an axis disposed parallel to and outwardly of said outer surface of said flange means, said shaft being so spaced from said projection means to permit longitudinal movement of said holddown device along said flange means in the unlocked position of said holddown device on said flange means, said shaft having an arm non-rotatably affixed thereto and extending radially therefrom, said arm having an eccentrically shaped surface adapted to engage said outer surface of said flange means during rotation of said arm about the axis of said shaft for camming said frame means to the locked position thereof on said flange means.

6. The combination as set forth in claim 5 wherein said arm has a surface opposite the camming surface thereof with a recess therein intermediate the ends of said arm, and wherein said frame means includes a spring wire journalled therein for rotation about an axis spaced outwardly from the axis of said shaft, said wire having a portion offset from the axis of rotation thereof and adapted to pivot into resilient tangential engagement with said arm until seated in said recess thereof to thereby hold said arm fixed in the camming position thereof wherein the arm holds said frame means in the locked position on said flange means.

7. The combination recited in claim 1 wherein said anchoring means comprises a T-section beam having a center web and a cross flange joined perpendicularly thereto, said flange means comprising said cross flange of said T-section beam.

8. The combination recited in claim 7 wherein said recess means comprise two longitudinally extending and laterally spaced rows of holes in said cross flange of said T-section beam, and wherein said frame means comprises a pair of parallel side plates spaced laterally apart for slidably receiving said cross flange of said T-section beam therebetween, each of said side plates having an integral flange extending therefrom towards said center web of said beam and adjacent the inner surface of said cross flange, each of said side plate flanges having a stud extending therefrom shaped to be received in one of said holes in the locked position of said holddown device to secure the same against movement longitudinally of said beam.

9. Apparatus for securing the cargo to a cargo carrier having a surface adapted to receive the cargo adjacent thereto, said apparatus comprising anchoring means affixed to said surface of said carrier and having flange means extending longitudinally of said carrier surface, said flange means having an outer surface facing the cargo and defined by a pair of laterally spaced parallel side edges, said flange means further having an inner surface opposite said outer surface and spaced from said carrier surface, said inner surface having recess means therein, a holddown device comprising frame means adapted to slidably receive said flange means therein so that said frame means embraces said side edges thereof for longitudinal sliding movement along said outer surface thereof and for limited movement perpendicular thereto between locked and unlocked positions relative thereto, said frame means having a portion adjacent said inner surface of said flange means including projection means extending therefrom for engagement with said recess means of said flange means in the locked position of said frame means to thereby lock said holddown device against longitudinal movement along said flange means, actuating means pivotably connected to said frame means so as to be rotatable into and out of engagement with said outer surface of said flange means for moving said holddown device between said locked and unlocked positions thereof, flexible means for connecting said holddown device to the cargo whereby said holddown device provides a longitudinally adjustable coupling between the cargo and the carrier and windlass means having one end of said flexible means connected thereto, said windlass means being journalled for rotation in said frame means about an axis spaced outwardly of said outer surface of said flange means of said anchoring means to provide clearance for winding said flexible means on said windlass means.

10. Apparatus for securing cargo to a cargo carrier comprising an anchoring rail adapted to be affixed to a surface of said carrier adjacent the cargo and having a generally T-shaped cross section defined by a web adapted to extend transversely from said surface to an outer edge of the web and a flange joined to said outer edge and disposed transversely to and extending from opposite sides of said web, said flange having a plurality of holes formed therein arranged in a row extending longitudinally of said rail and spaced transversely from said web, a holddown mechanism including a pair of side plates interconnected in spaced relation for receiving said flange therebetween and having edge portions separated by said web extending towards each other adjacent the web side of said flange for slidably interengaging the holddown mechanism with said rail for longitudinal movement therealong, said holddown mechanism also including means for locking the same against longitudinal movement along said rail comprising a stud carried by said holddown mechanism adapted to register with any selected one of said flange holes for insertion therein and means pivotally mounted on said holddown mechanism and pivotal into engagement with said rail flange to force said stud into said hole and draw said edge portions of said side plates against said rail flange for locking the holddown member in a longitudinally adjusted position on the rail, and a windlass mechanism supported between said side plates on the side of said flange opposite said web side thereof for applying tension to a flexible element adapted for interconnecting the holddown member to the cargo positioned adjacent said cargo carrier surface.

11. In combination, a cargo carrier having a deck for supporting cargo, anchoring means secured to said deck of the cargo carrier comprising a rail having a portion of generally T-shaped cross section defined by a web extending transversely from said deck and a flange extending transversely to said web spaced from said deck, said flange having a longitudinally extending row of holes therein spaced transversely from said web, a holddown mechanism comprising a pair of side plates connected in spaced apart relation and having their lower ends turned inwardly and extending towards each other adjacent the web side of said flange for slidably interengaging the holddown mechanism with said rail for longitudinal movement therealong, said holddown mechanism being free to shift on said rail to a limited extent in an unlocked condition thereof in a direction perpendicular to said flange, said holddown mechanism having locking means including a stud carried thereby adapted to be inserted in any selected one of said flange holes by said shifting movement and means pivotally mounted on said holddown mechanism pivotal into engagement with said rail flange for imparting said shifting movement to the holddown mechanism in a direction to draw said inwardly turned ends of said side plates up tightly against said web side of said flange, and a windlass mechanism supported between said side plates adjacent the side of said flange opposite said web side thereof for applying tension to a flexible element adapted for interconnecting said holddown member to cargo positioned on the deck.

12. A holddown mechanism comprising a pair of spaced parallel side plates and means including a windlass mechanism extending transversely between said side plates and interconnecting the same in said spaced parallel relation, each of said side plates having an inturned edge with said inturned edges extending towards one another and being spaced from said interconnecting means and from one another to define therebetween a clearance space of T-section shape taken in a plane perpendicular to said side plates within which said mechanism is adapted to slidably receive a T-section anchor rail longitudinally through the clearance space, said inturned edges of said side plates each having a stud secured thereto extending into said clearance space, said interconnecting means also including a shaft disposed transversely of said plates and having an arm carried thereby for rotation about the axis of the shaft and extending radially therefrom, said arm having a surface shaped eccentrically relative to said axis and movable towards said inturned plate edges into said beam receiving space upon rotation of said arm about said axis.

References Cited by the Examiner
UNITED STATES PATENTS

| | | | |
|---|---|---|---|
| 1,934,697 | 11/33 | Butterworth | 105—368 |
| 1,934,841 | 11/33 | Copony | 105—368 |
| 2,137,979 | 11/38 | Cooper | 105—368.1 |
| 2,178,693 | 11/39 | McMullen | 105—368 |
| 2,204,377 | 6/40 | Nightingale | 105—368.1 |
| 2,873,693 | 2/59 | Chapman et al. | 105—368 |
| 2,969,023 | 1/61 | Chapman et al. | 105—368 |
| 2,970,552 | 2/61 | Baker | 105—368 |
| 3,038,740 | 6/62 | Blunden | 280—179 |
| 3,092,368 | 6/63 | McDowell et al. | 280—179 X |

LEO QUACKENBUSH, *Primary Examiner.*

JAMES S. SHANK, *Examiner.*